United States Patent
Ferenczi et al.

(10) Patent No.: US 9,254,539 B2
(45) Date of Patent: Feb. 9, 2016

(54) MANUFACTURING SYSTEM

(71) Applicant: Triumph Aerostructures, LLC, Arlington, TX (US)

(72) Inventors: Laszlo Ferenczi, Irving, TX (US); Gary Pekar, Mansfield, TX (US)

(73) Assignee: Triumph Aerostructures, LLC, Arlington, TX (US)

( * ) Notice: Subject to any disclaimer, the term of this patent is extended or adjusted under 35 U.S.C. 154(b) by 0 days.

(21) Appl. No.: 14/691,254

(22) Filed: Apr. 20, 2015

(65) Prior Publication Data
US 2015/0224614 A1  Aug. 13, 2015

Related U.S. Application Data

(62) Division of application No. 12/839,950, filed on Jul. 20, 2010, now Pat. No. 9,038,265.

(60) Provisional application No. 61/236,783, filed on Aug. 25, 2009.

(51) Int. Cl.
*B23P 21/00* (2006.01)
*B64F 5/00* (2006.01)

(52) U.S. Cl.
CPC ............. *B23P 21/004* (2013.01); *B64F 5/0009* (2013.01); *B23P 2700/01* (2013.01); *Y10T 29/534* (2015.01)

(58) Field of Classification Search
CPC .. B23P 21/004; B23P 2700/01; B64F 5/0009; Y10T 25/534
USPC .......... 29/429, 430, 431, 822, 823, 824, 783, 29/785, 791, 792, 799, 711, 712; 212/312, 212/317, 318, 324; 198/345.1, 346.1, 198/346.2, 346.3
See application file for complete search history.

(56) References Cited

U.S. PATENT DOCUMENTS

| | | | |
|---|---|---|---|
| 3,154,979 A * | 11/1964 | Crispin | B21J 15/10 29/243.54 |
| 3,358,348 A * | 12/1967 | McGlinchey | B27F 7/155 100/100 |
| 3,783,719 A | 1/1974 | Gugliotta | |
| 4,310,878 A | 1/1982 | Hyatt | |

(Continued)

OTHER PUBLICATIONS

International Preliminary Report on Patentability dated Mar. 8, 2012 for International Application No. PCT/US2010/044580 filed Aug. 5, 2010, 7 pages.

(Continued)

*Primary Examiner* — David Bryant
*Assistant Examiner* — Steven A Maynard
(74) *Attorney, Agent, or Firm* — Klemchuk LLP; Kirby B. Drake

(57) ABSTRACT

A manufacturing system is provided comprising a plurality of work stations having one or more tools for processing a work item, at least one carrier for moving a work item among the plurality of work stations, and a platform for connecting the plurality of work stations. In a further embodiment, at least one of the plurality of work stations is not on a line with the other work stations and may include a lift machine for raising and/or lowering the at least one carrier and the work item. The platform also may preferably comprise at least one rotator for changing the direction of movement of the at least one carrier on the platform. The system also may preferably comprise at least one conveyer for transporting the at least one carrier to the platform.

12 Claims, 8 Drawing Sheets

(56) References Cited

U.S. PATENT DOCUMENTS

| | | | |
|---|---|---|---|
| 4,564,100 | A | 1/1986 | Moon |
| 4,738,387 | A | 4/1988 | Jaufmann et al. |
| 4,894,908 | A | 1/1990 | Haba, Jr. et al. |
| 5,013,203 | A * | 5/1991 | Wakabayashi ............. B61J 1/10 104/35 |
| 5,152,050 | A | 10/1992 | Kaczmarek et al. |
| 5,177,862 | A | 1/1993 | Speece |
| 5,186,304 | A | 2/1993 | Kaczmarek et al. |
| 5,240,746 | A | 8/1993 | O'Connell |
| 5,271,490 | A * | 12/1993 | Sticht ................... B23P 21/004 198/346.1 |
| 6,076,652 | A | 6/2000 | Head, III |
| 6,098,268 | A | 8/2000 | Negre et al. |
| 6,236,901 | B1 | 5/2001 | Goss |
| 6,574,520 | B1 | 6/2003 | Liu et al. |
| 6,742,459 | B2 | 6/2004 | Lucas |
| 6,745,454 | B1 | 6/2004 | Grimshaw et al. |
| 6,801,821 | B2 | 10/2004 | Madden et al. |
| 6,920,973 | B2 | 7/2005 | Koren et al. |
| 8,042,249 | B2 * | 10/2011 | Kilibarda ................ B23P 21/00 228/112.1 |
| 8,141,223 | B2 | 3/2012 | Taniguchi et al. |
| 2002/0100158 | A1 | 8/2002 | Lak et al. |
| 2006/0011403 | A1 * | 1/2006 | Sjoberg .................... B62D 1/02 180/326 |
| 2008/0234858 | A1 | 9/2008 | Dollens |

OTHER PUBLICATIONS

International Search Report and Written Opinion issued for International Application No. PCT/US2010/044580, dated Sep. 23, 2010, 8 pages.

* cited by examiner

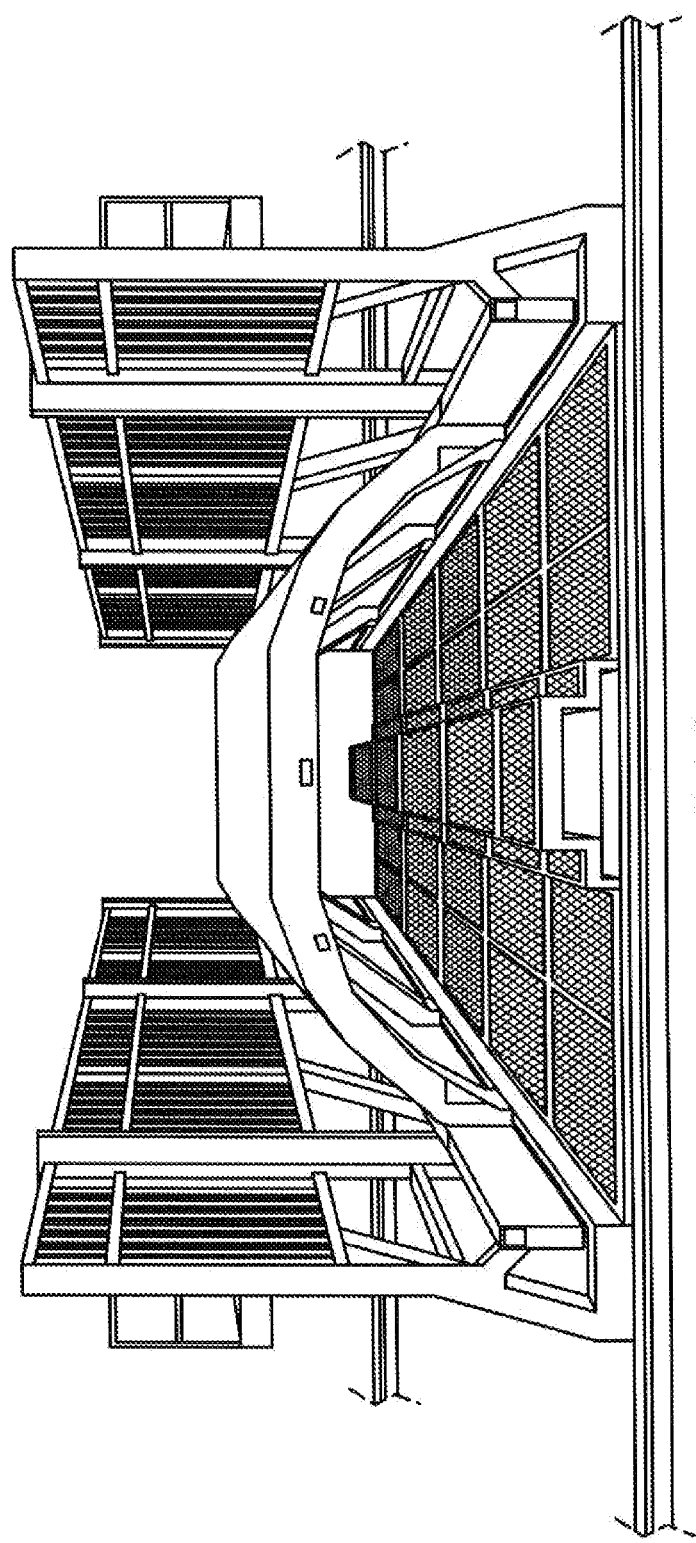

MANUFACTURING SYSTEM

CROSS REFERENCE TO RELATED APPLICATIONS

The present application claims priority to, and is a divisional of, U.S. patent application Ser. No. 12/839,950, entitled "Manufacturing System," filed Jul. 7, 2010, and U.S. Provisional Application Ser. No. 61/236,783, entitled "Lean Assembly Line," filed Aug. 25, 2009, which are hereby incorporated by reference for all purposes.

TECHNICAL FIELD

The present disclosure relates to manufacturing systems, and more particularly, to manufacturing systems including an automated manufacturing and assembly line.

BACKGROUND

In conventional manufacturing and assembly lines, such as those used in the aerospace industry for manufacturing of aircraft, attempts to automate manufacturing and assembly lines generally have been limited to straight-line towing of a nearly completed assembly, such as an airplane. Assembly operations, such as riveting, typically take place in traditional fixed locations, thereby requiring use of conventional crane to move a carrier containing a work item into position for assembly. For example, assembly jigs are regularly used as carriers in the manufacturing and assembly of bonnets for aircraft. In a conventional aerospace assembly line, an assembly jig might be located in a high bay on the manufacturing floor for pre-riveting operations. When it is time to perform riveting operations, the assembly jig must be lifted using a conventional crane and delivered to an automatic riveting machine found in another workstation on the manufacturing/assembly floor. Upon completion of riveting operations on the automatic riveting machine, the assembly jig must again be lifted using the conventional crane and returned to its high bay location.

Loading a carrier for large work items, such as bonnets, onto a conventional crane often requires between 45 minutes and 1 hour of manufacturing/assembly floor time, and this estimated time period presumes that the crane is even available for use in lifting operations. This same estimated amount of time then may be required to return the carrier to its original location in the high bay upon completion of manufacturing/assembly operations, such as riveting. This results in 1½ hours minimum of lost floor time and machine time, resulting in at least 3 hours manufacturing time lost per work item (i.e., bonnet). Further, when the crane is in use, the manufacturing/assembly floor is unable to be effectively used for other manufacturing/assembly operations in order to address safety concerns with respect to workers performing tasks on the manufacturing/assembly floor in proximity to these carriers moving sometimes quite large work items around the floor.

SUMMARY

The present disclosure is directed to a manufacturing system comprising a plurality of work stations having one or more tools for processing a work item, at least one carrier for moving the work item among the plurality of work stations, and a platform for connecting the plurality of work stations. In a further embodiment, at least one of the plurality of work stations is not on a line with the other work stations and may include a lift machine for raising and/or lowering the at least one carrier and the work item. The platform also may preferably comprise at least one rotator for changing the direction of movement of the at least one carrier on the platform. The system also may preferably comprise at least one conveyer for transporting the at least one carrier to the platform. The carrier may preferably be a jig for positioning.

Another embodiment of the present disclosure is directed to a manufacturing system for moving an assembly jig, the system comprising a plurality of work stations and at least one rail that receives the assembly jig, whereby the assembly jig moves between the plurality of work stations via the at least one rail. One of the plurality of work stations may be a lift machine for lifting the assembly jig. Rails incorporated into the manufacturing system may be circular or straight. The system also may further comprise at least one rotator for changing the direction of movement of the assembly jig on the at least one rail by turning each leg of the assembly jig individually. Rotators incorporated into the manufacturing system may be three-position or two-position rotators. The system also may comprise at least one drive for changing the direction of movement of the assembly jig on the at least one rail. Drives incorporated into the manufacturing system may include rack and pinion drives for directing movement in a lengthwise direction and chain drives for directing travel in a sideways direction. A turntable at a junction point of the plurality of work stations is preferably incorporated for changing the direction of movement of the assembly jig within the manufacturing system. At least one switch is preferably incorporated into the manufacturing system, and the switch may be a single or double switch. The manufacturing system also may preferably include a central control unit comprising a single processor for controlling movement of the assembly jig among the plurality of work stations within the manufacturing system, and the central control unit is preferably elevated above the plurality of work stations.

According to another embodiment of the present disclosure, a manufacturing system comprises a plurality of work stations, at least one carrier for moving a work item among the plurality of work stations, wherein at least one of the plurality of work stations is a lift machine for lifting or lowering the at least one carrier and the work item, and a platform for connecting the plurality of work stations. The lift machine preferably comprises three servo axes, one closed loop non-servo axis, and one open loop platform axis. At least one gear drive motor preferably directs the at least one carrier and the work item onto the lift machine. The manufacturing system also preferably comprises at least one sensor monitoring the position of the at least one carrier and the work item on the lift machine.

In an embodiment, the shear-bearing mechanism comprises a recess in the structure; and the body is disposed within the recess. In another embodiment, a portion of the body extends beyond the recess. In yet another embodiment, walls of the recess are operable to direct a portion of the shear forces away from the body when the body frictionally engages the contact surface.

BRIEF DESCRIPTION OF THE DRAWINGS

For a more complete understanding of the present disclosure, reference is now made to the following descriptions taken in conjunction with the accompanying drawings, in which:

FIG. 8 depicts a lift machine according to an embodiment of the present disclosure.

DETAILED DESCRIPTION

Figure 1:
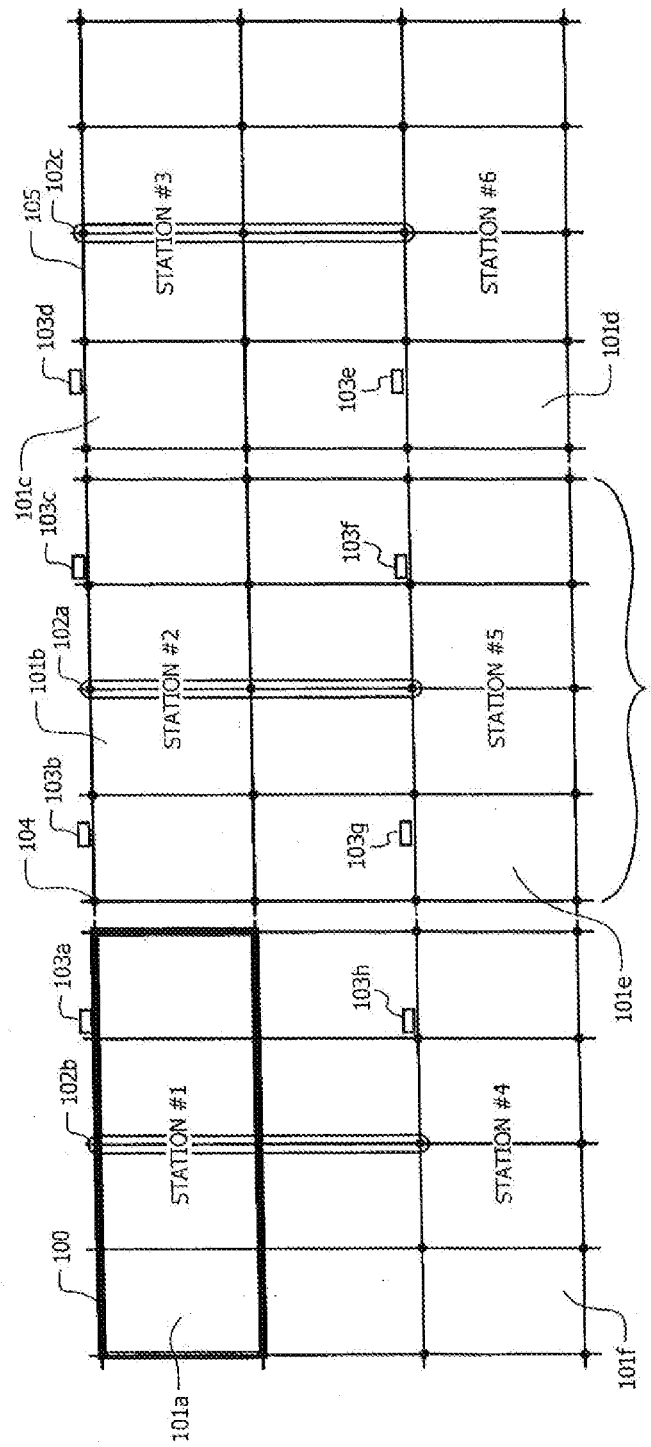
FIG. 1 depicts a manufacturing system according to an embodiment of the present disclosure.

The manufacturing system according to embodiments of the present disclosure is an independent orientation system, as the system needs not be concerned which work station a carrier passes through at any given time during the manufacturing/assembly process. According to embodiments of the present disclosure, the carrier traveling around the manufacturing system is a "dumb" device insofar as the central control unit (or processor) controlling the manufacturing system knows where the carrier transporting a work item is at a given time, but the control processing system need not be integrated into the carrier or the work item in order to make the carrier transporting the work item effectively travel around the manufacturing/assembly floor.

The modular design of the manufacturing system according to embodiments of the present disclosure addresses the challenges presented in a traditional industrial engineering and assembly building layout while maintaining movement flexibility and the potential for ready expansion of the assembly line in any direction or any configuration. The manufacturing system according to embodiments of the present disclosure is fully automated and allows for maximum use of the manufacturing/assembly floor and building layout, permitting productive use of all of the available floor. More specifically, the modular design of the manufacturing system provides freedom to select any path direction for a work item to move, thus creating a manufacturing and assembly line with unmatched flexibility. This automated modular manufacturing system according to embodiments of the present disclosure preferably decreases span time, thereby enabling higher manufacturing move rates, as well as improvements in personal and product safety throughout the manufacturing process.

According to embodiments of the present disclosure, a manufacturing system incorporating an automated manufacturing/assembly line is disclosed. The manufacturing system preferably comprises a plurality of work stations having one or more tools for processing a work item, at least one carrier for moving the work item among the plurality of work stations, and a platform or grid for connecting the plurality of work stations. The manufacturing system may be constructed in a manner wherein at least one of the plurality of work stations is not on a line with the other work stations and may include a lift machine for raising and/or lowering the at least one carrier and the work item. The platform may include at least one rotator for changing the direction of movement of the carrier on the platform, and the manufacturing system also may include at least one conveyer for transporting the carrier to the platform according to embodiments of the present disclosure.

This disclosure is particularly a breakthrough for the aerospace industry in that it permits assembly of larger-sized airframe components using an automated assembly line. More specifically, the manufacturing system according to embodiments of the present disclosure facilitates in assembly of the major fuselage panels (bonnets) for cargo and passenger airplanes. According to embodiments of the present disclosure, the manufacturing system facilitates movement of carriers, such as assembly jigs often weighing in excess of 25,000 pounds and having dimensions of over 50 feet by 20 feet, around a manufacturing/assembly floor. A unique combination of drive systems and steering enable a carrier to travel throughout the manufacturing/assembly floor in tight and precise patterns, maximizing use of floor space while maintaining movement flexibility for the carrier transporting a work item and the possibility of easy and modular line expansion of the manufacturing system.

FIG. 1 depicts manufacturing system 10 according to an embodiment of the present disclosure. In FIG. 1, the manufacturing floor of manufacturing system 10 is divided into six work stations 101a-101f in a grid formation; however, it should be appreciated that the grid formation of manufacturing floor for manufacturing system 10 may be divided into more or fewer work stations without departing from the objects of the present disclosure. It also should be appreciated that the floor of manufacturing system 10 on which carrier 100 moves can be constructed from any desired material as long as it provides sufficient support for the working personnel.

Carrier 100, such as an assembly jig for aerospace manufacturing operations, transporting a work item preferably is moved around the grid of manufacturing system 10 through work stations 101a-101f so that various manufacturing/assembly operations may be performed on the work item. Carrier 100 preferably initiates movement from work station 101a of manufacturing system 10 as shown in FIG. 1 and then moves around to other work stations 101b-101f via a rail mechanism, such as rail 105 depicted in station 101c of manufacturing system 10. Carrier 100 travels around manufacturing system 10 by having free-swiveling legs that can move along the rails using air-powered rotators, railroad-style switches, open-loop servo chain drives and rack and pinion drives. Rails are preferably constructed tracing the interior and exterior grid pattern of manufacturing system 10 such that carrier 100 may move across work stations utilizing drives and rotators incorporated into manufacturing system 10 as described in more detail below. Accordingly, station #1 (101a) preferably includes rails such that carrier 100 may move to station #2 (101b) or station #4 (101f) using the rail mechanism in combination with drives and rotators directing the movement of carrier 100.

At least one chain drive 102a-102c is preferably incorporated into manufacturing system 10 to enable carrier 100 to move across the plurality of work stations 101a-101f in manufacturing system 10. Chain drives 102a-102c preferably direct travel of carrier 100 through transverse movements within manufacturing system 10. In a preferred embodiment of the present disclosure, three chain drives are preferably incorporated into manufacturing system 10. However, it should be appreciated that more or fewer than three chain drives may be incorporated into manufacturing system 10 without departing from the objects of the present disclosure.

Manufacturing system 10 also preferably includes at least one rack and pinion drive 103a-103h to assist in moving carrier 100 around the plurality of work stations. Rack and pinion drives are preferably used for longitudinal movements within manufacturing system 10. While at least one rack and pinion drive 103*a*-103*h* is depicted in each work station 101*a*-101*f* in FIG. 1, it again should be appreciated that more than one rack and pinion drive may be incorporated into a work station of manufacturing system 10 without departing from the objects of the present disclosure.

Figure 5:
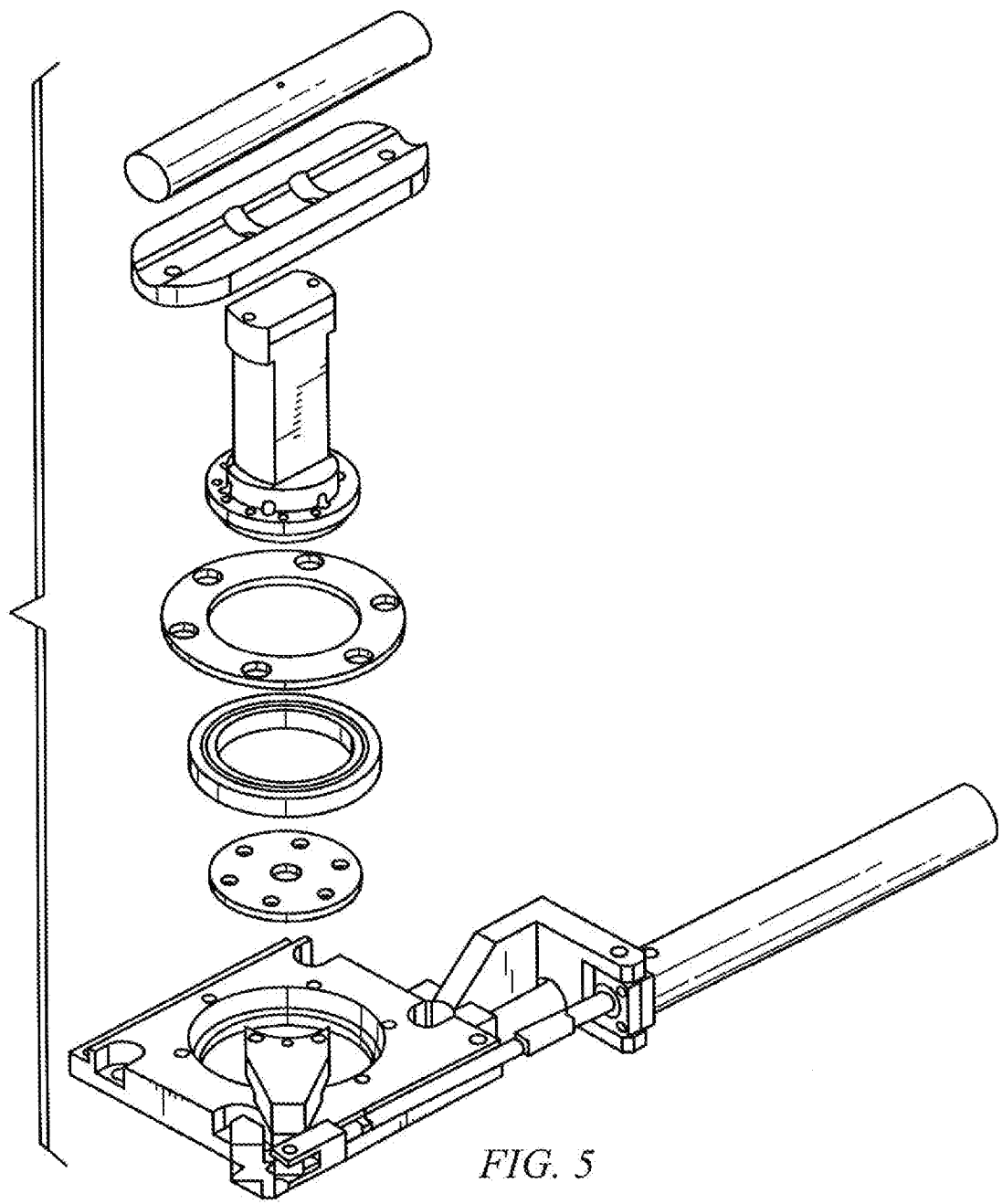
FIG. 5 depicts an exploded view of a rotator according to an embodiment of the present disclosure.
Figure 6:
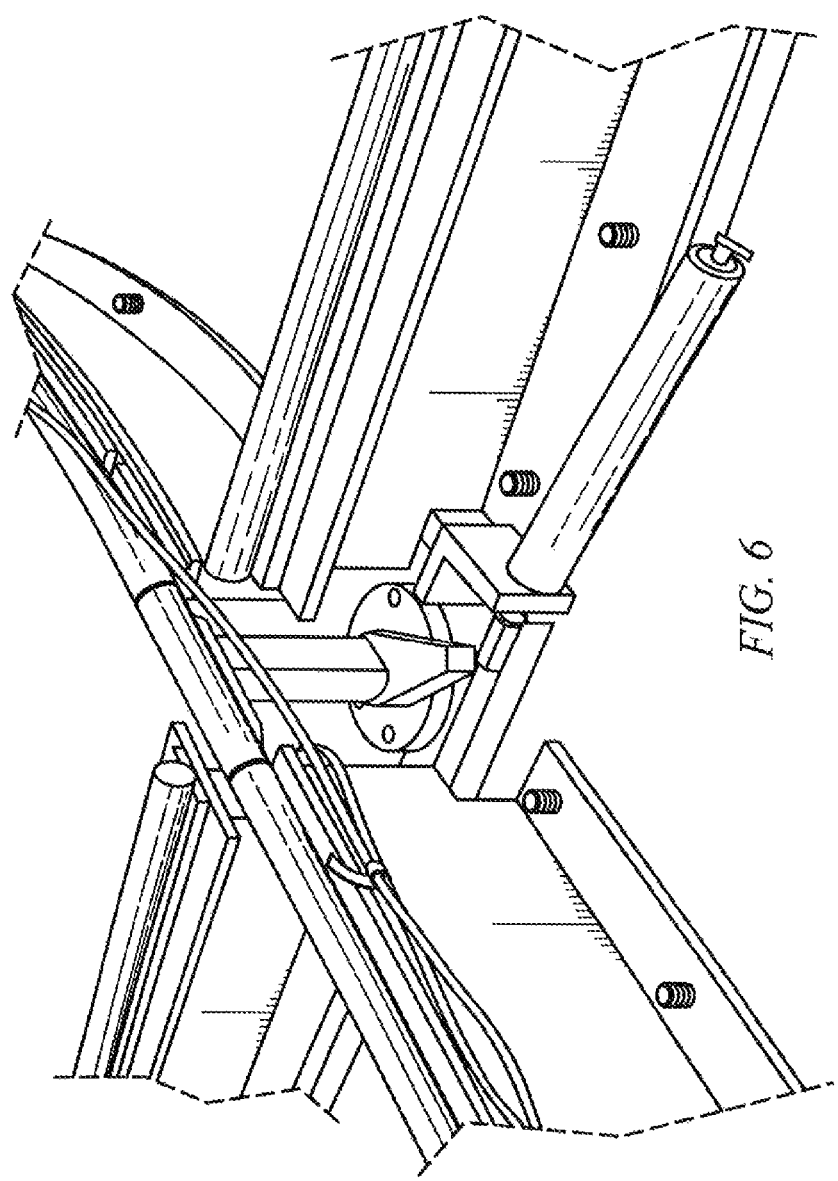
FIG. 6 depicts a view of a rotator in a system grid according to an embodiment of the present disclosure.
Figure 7:
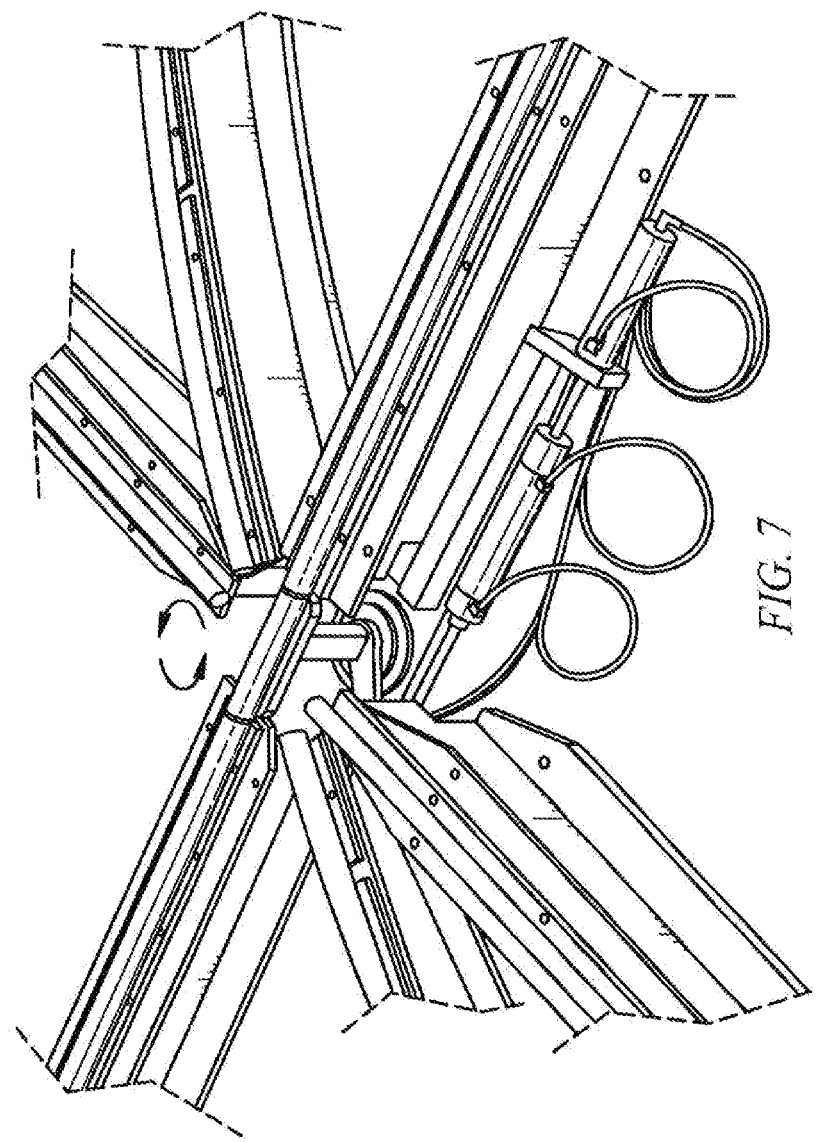
FIG. 7 depicts another view of a rotator in a system grid according to an embodiment of the present disclosure.

Rotators, such as rotator 104 or the exploded view of a rotator depicted in FIG. 5, are preferably incorporated into manufacturing system 10 at various positions within the grid layout of manufacturing system 10. Rotators preferably are located at junctions between or within work stations on the grid of manufacturing system 10 to permit movement of carrier 100 in any direction on a turntable (as depicted in FIGS. 6-7) allowing for movement of carrier 100 at any angle desired. As many rotators can be incorporated into manufacturing system 10 as is desired to move carrier 100 in desired directions on the grid of manufacturing system 10 without departing from the objects of the present disclosure. This series of mechanical rotators (preferably coupled with proximity sensors) and gear drive motors (preferably coupled with encoder feedback) direct the dumb carriers through the plurality of work stations. Each work station preferably includes at least one gear drive and at least one rotator.

Accordingly, carrier 100 can travel forward, backward, and as well as in a 90-degree direction preferably using a turntable in any arbitrary path, and carrier 100 also is preferably capable of pivoting on its own center. The combination of drive and steering devices enables carrier 100 to be a non-powered "dumb" vehicle, ensuring simplicity of movement as well as path and layout flexibility.

Figure 2:
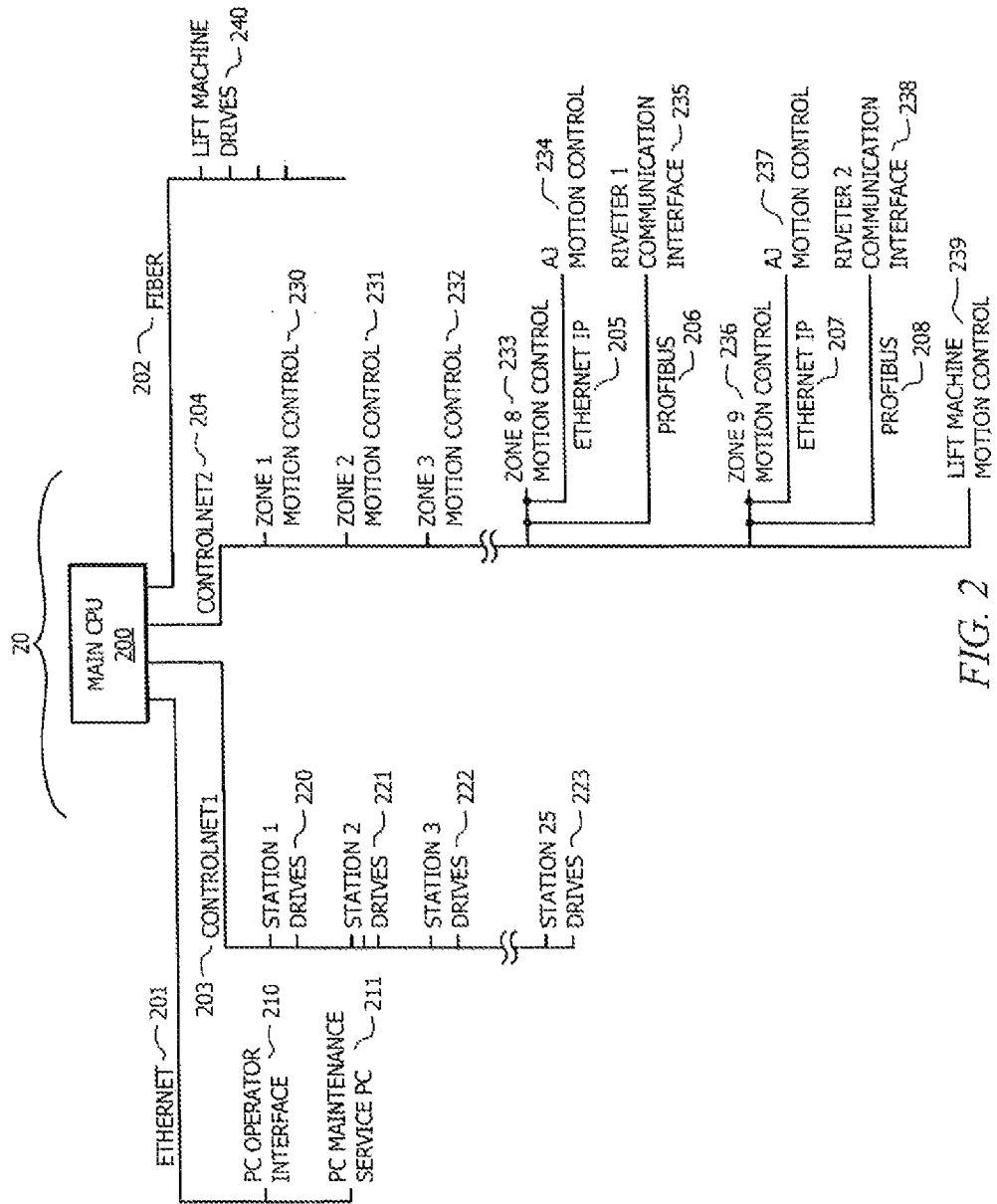
FIG. 2 depicts an embodiment of a control topology for a manufacturing system according to an embodiment of the present disclosure.

FIG. 2 depicts an embodiment of control topology 20 for a manufacturing system according to an embodiment of the present disclosure. Communication to and among different work stations of manufacturing system 10 is preferably achieved through a main or central CPU 200. This single processor controls all different functions of the manufacturing system. The control center is preferably at a level elevated above the manufacturing/assembly floor to enable the operator to view and manage the functions of the manufacturing system from a single computer interface. Main CPU 200 operates the manufacturing system preferably through Ethernet 201, fiber 202 and ControlNet 203, 204 communication interfaces. Ethernet 201 preferably controls PC operator interface 210 and PC maintenance service PC 211. A lift machine may preferably incorporated into a manufacturing system according to embodiments of the present disclosure as will be discussed in more detail with respect to FIG. 3, and fiber 202 preferably controls lift machine drives 240.

According to an embodiment of the present disclosure, several ControlNet interfaces are utilized. It should be appreciated that ControlNet is preferably utilized because of its deterministic characteristics. While other industrial networks may be utilized in place of ControlNet, such as Ethernet or DeviceNet, they generally present a higher risk in this application; however, the control topology would remain the same. ControlNet1 203 preferably controls and directs the operations of station drives 220, 221, 222, 223 within a manufacturing system according to embodiments of the present disclosure may incorporate as many work stations, and accordingly as many station drives, as is desired into the manufacturing system without departing from the objects of the present disclosure. ControlNet2 203 preferably incorporates zone motion control 230, 231, 232, 233, 236. Again, it should be appreciated that while FIG. 2 depicts motion control for nine zones, more or fewer zones may be incorporated into the grid of the manufacturing system as desired without departing from the objects of the present disclosure.

In the control topology of FIG. 2 for a manufacturing system according to embodiments of the present disclosure, zone 8 motion control (233) depicts an expanded view of different communication interfaces that may preferably be incorporated into a given zone of the manufacturing system, including Ethernet IP 205 and Process Field Bus (Profibus) 206. Ethernet IP (205) preferably directs carrier motion control (234) and Profibus (206) preferably controls riveter 1 communication interface (235). Similarly, zone 9 motion control (236) includes Ethernet IP (207) which directs carrier motion control (237) and Profibus (208), which preferably directs riveter 2 communication, interface (238). Profibus is preferably used to communicate with automatic riveting machines because it is readily available on the riveting machines; however, other methods to pass data may be incorporated without departing from the objects of the present disclosure.

Through main CPU 200, an operator selects a path for the carrier to travel within the grid formation of the manufacturing system. The path preferably includes a departure work station (such as work station 101*a* in FIG. 1), sequential intermediate work stations and a destination/arrival work station. As a carrier transporting a work item travels through various work stations on the platform of the manufacturing system, proximity sensors and encoders detect the carrier's position relative to the work station to where the carrier is leaving, heading to or presently located. As a traveling carrier is passed to an adjacent work station, drives are programmed through main CPU 200 to ensure a smooth transition across work stations.

Operations, including maintenance of the manufacturing system, are preferably directed from an elevated control center where main CPU 200 is preferably housed. This preferably enables an operator to view and operate all functions of the manufacturing system from a single computer interface. This permits easier visual monitoring of the manufacturing system footprint.

Multiple operator/maintenance screens are preferably accessible through main CPU 200 to provide an interface to perform various operations with respect to the manufacturing system. An operator of main CPU 200 may utilize a screen the select the desired path for the carrier. For example, in the manufacturing/assembly of a bonnet, the operator may utilize main CPU 200 to move the carrier transporting the bonnet from/to riveters, the lift machine as well as the high or low bay. The operator may initiate carrier motion using main CPU 200, shift motion of the carrier while it is moving on a rail of the manufacturing system or even shift position of the carrier within a work station. If maintenance is required on a work station or a component of the manufacturing system, that work station or component can be isolated from the rest of the manufacturing system using main CPU 200 to enable continued operation of the manufacturing system while maintenance occurs on the independent work station or component. Troubleshooting of the manufacturing system also is preferably conducted using main CPU 200. It should be appreciated that the type and composition of operator/maintenance screens accessed through main CPU 200 may change depending on factors such as the type of manufacturing system involved, the type of work item being moved through the manufacturing system, the application involved and the layout of the manufacturing system grid.

Figure 3:
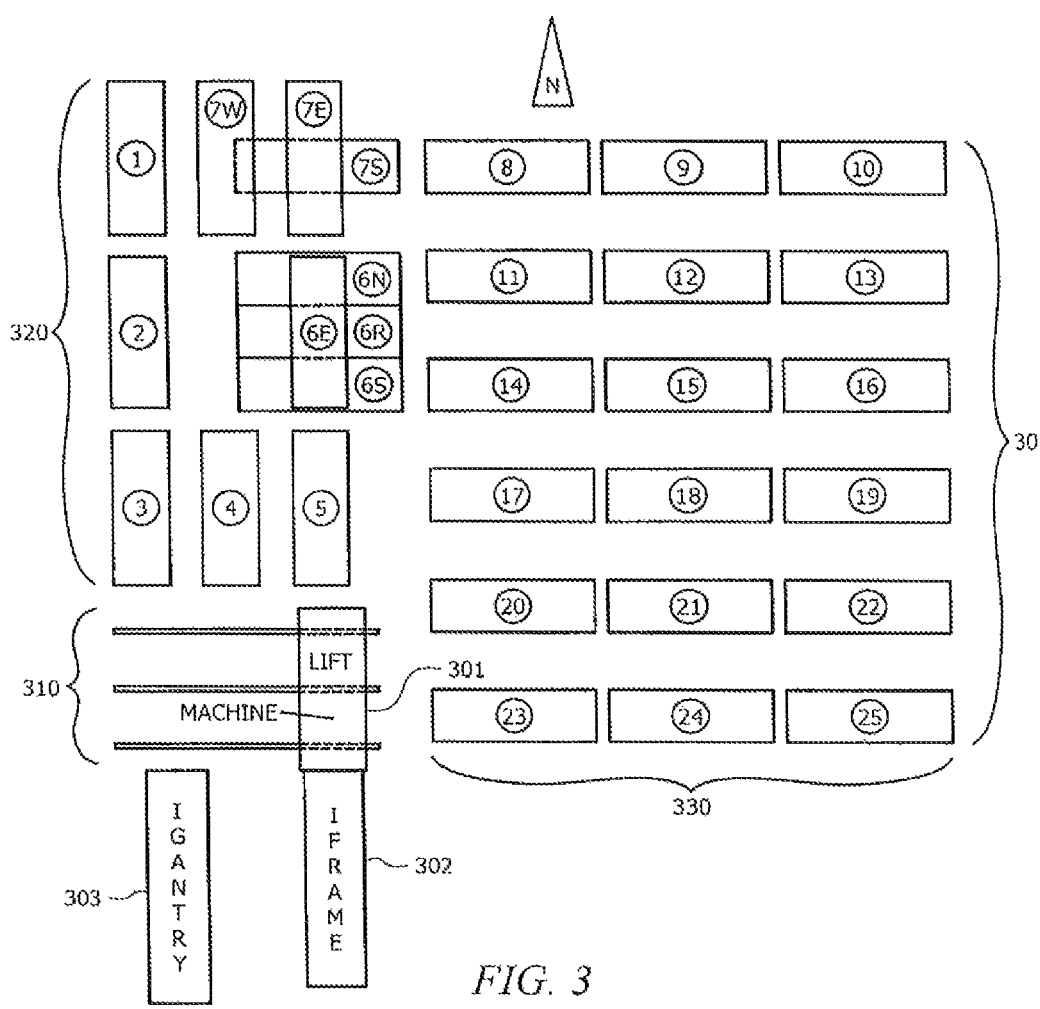
FIG. 3 depicts a manufacturing system according to an embodiment of the present disclosure.

According to another embodiment of the present disclosure, FIG. 3 depicts a layout for manufacturing system 30 incorporating lift machine 301, and FIG. 8 depicts a lift machine according to an embodiment of the present disclosure. While lift machines are often used in manufacturing/assembly systems, lift machines have not previously been used to support carriers of considerable size, such as assembly jigs that have been previously discussed. While a lift machine may not be required, or even utilized, in all manufacturing systems according to embodiments of the present disclosure, it should be appreciated that incorporation of a lift machine preferably allows movement and lifting action of a carrier transporting a work item without the need to utilize cranes on the manufacturing/assembly floor. Thus, the lift machine preferably serves as an additional work station for the manufacturing system, and additional assembly/manufacturing operations may be performed simultaneously while the carrier is positioned at a lift machine station.

Lift machine 301 preferably elevates a carrier above the floor of the manufacturing system to enable manufacturing operations that cannot otherwise be performed on the manufacturing floor and would likely have required use of a crane in the past to provide the proper elevation to perform manufacturing and assembly operations. For example, an assembly jig may be elevated using a lift machine for automated riveting operations. Such operations can be performed as much as 12 feet above the grid floor of the manufacturing system. The lift machine provides adequate support for the considerable size of an assembly jig, as previously discussed.

Lift machine 301 preferably incorporates three servo axes (Y, ZM, and ZS), one closed loop non servo axis (X) and one open loop platform axis (P). Two gear drive motors (preferably coupled with encoder feedback) direct/position a carrier onto lift machine 301. Through the main control console (previously described in connection with FIG. 2), an operator of manufacturing system 30 preferably identifies and selects a carrier load and unload path for the carrier to travel through the grid of manufacturing system 30. For example, in order for a carrier to reach lift machine 301, the carrier may have to move along a path from work stations 330 directly to lift machine 301 at work station 310. Alternatively, depending on the configuration of the work stations and the operations needing to be performed on the work item, the carrier may move from one of work stations 330 over to one or more of the work stations 320 prior to traveling to lift machine 301.

In operation, when a carrier transporting a work item is moved onto lift machine 301 at a load position, proximity sensors and encoders preferably detect the carrier's position relative to the park position in order to determine the location of the carrier at any given time relative to lift machine 301. The carrier preferably will remain at the lift machine park position until lift machine 301 is commanded to the unload position.

Close tolerances are preferably maintained in order to keep from skewing the carrier transporting the work item as well as the work item itself and causing distortion. Locking pins preferably secure the carrier to lift machine 301. There are safety features incorporated into the lift machine in order to monitor every moving part to see that it operates properly. Safety is of paramount concern given the weight of the work items, as well as the carriers, being manipulated. Two groups of three jackscrews (ZM and AS) preferably raise and lower lift machine 301 to the desired load/unload positions, and absolute encoders monitor each jackscrew axis skew. If any one of the absolute encoder position values does not match the master ZM control command position, an emergency stop condition is activated. Lift machine 301 preferably powers down if there is any deviation in order to avoid damage to the work item and the carrier or to the lift machine itself.

Additional sensors preferably monitor the carrier's position on the lift machine so that an emergency stop condition may be initiated if the carrier is in an unwanted location. End stop pins preferably are extended as a redundant safety mechanism to insure that the carrier is adequately secured to lift machine 301. ZM and ZS servomotors are electronically coupled to synchronize their motion. After the lift machine reaches the desired unload position, the gear motors preferably drive the carrier off of lift machine 301, and the carrier may then travel to a subsequent work station for further manufacturing/assembly operations.

Utilizing its transverse move capabilities, lift machine 301 creates a "bridge" between rail lines and work stations comprising the grid of manufacturing system 30. Lift machine 301 also may preferably act as an additional work station where other assembly and manufacturing tasks may be performed according to embodiments of the present disclosure. For example, parts installation generally cannot be performed at a riveting work station. However, according to embodiments of the present disclosure, a carrier, such as an assembly jig, may be transferred from a riveting station to a lift machine station where parts installation may occur, and then the carrier may be preferably transferred back to a riveting work station upon completion of the parts installation.

This is a unique combination of a lifting device for large carriers and a fully functional work station. The lifting, transverse motion and work platform operation features are combined into one work station. It enables the end user to maximize operational space and minimize time spent for non-value added activities. The lift machine (such as depicted in FIG. 8) preferably has a platform to allow mechanics to walk on the platform and monitor the lift machine operations as well as other operations on the manufacturing/assembly floor. The rails line up on the lift machine to allow the tool/part to roll on and off. Other manufacturing system work stations, such as iGantry 303 and iFrame 302, are depicted in FIG. 2. Lift machine 301 preferably reduces span time for work items.

Figure 4:
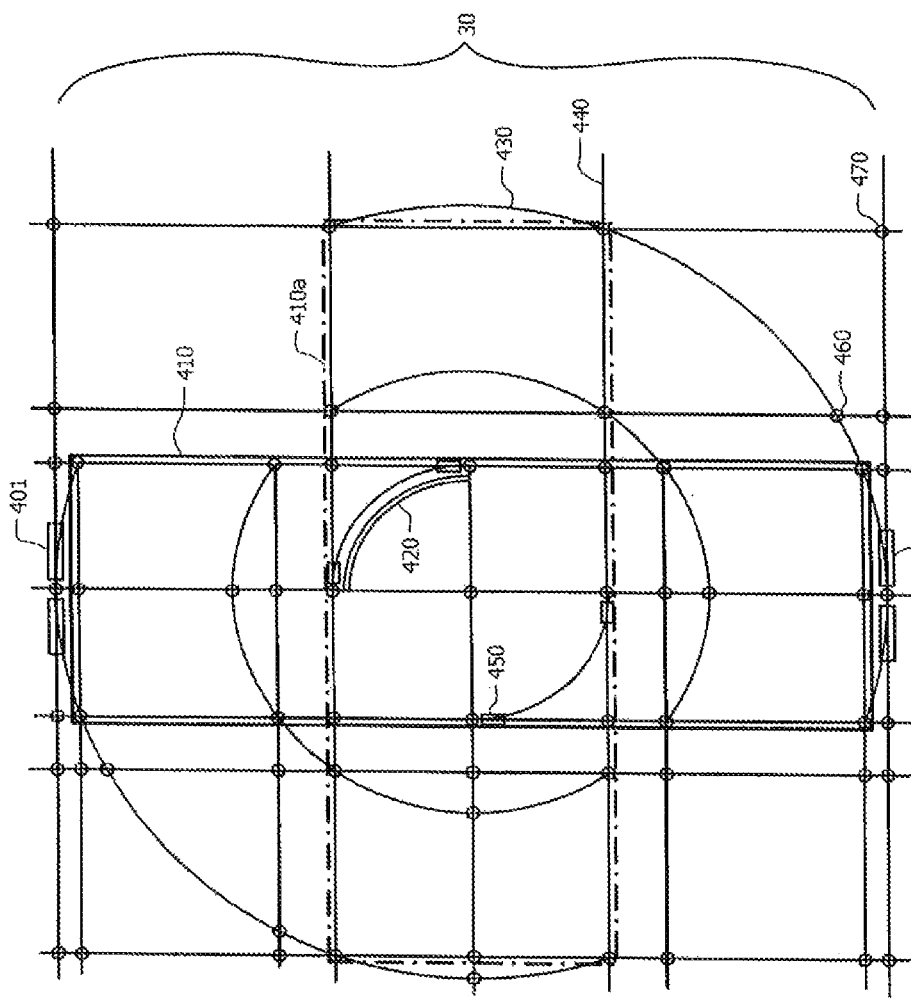
FIG. 4 depicts a manufacturing system incorporating a turntable according to an embodiment of the present disclosure.

FIG. 4 depicts manufacturing system 40 according to another embodiment of the present disclosure. Manufacturing system 40 incorporates a turntable including turntable drive 420 in order to rotate carrier 410. In addition, different types of rails are incorporated into manufacturing system 40 including circular rails 430 and straight rails 440. In this embodiment of manufacturing system 40, several types of switches are incorporated. For example, a single switch 450 may be utilized for movements in the east/west direction as well as in the north/south direction. If other angles of movement are needed, double switches (401, 402) are preferably utilized. These switches are preferably located in the high bay of the manufacturing system layout where curved rails preferably mate with straight rails. However, it should be appreciated that the desired manufacturing system layout will drive the requirements for the number and type of switches employed. Similarly, different types of rotators may be utilized in operation of a turntable, including 3-position rotators (460) and 2-position rotators (470) in manufacturing system 40 (as such as the rotators deployed on a platform depicted in FIGS. 6-7). As shown in FIG. 4, carrier 410 is rotated 90 degrees, and carrier 410a depicts the position of carrier of 410 following such a rotation on the turntable.

The manufacturing system according to embodiments of the present disclosure includes a number of safety features given the weight of the work items and the carriers being manipulated. For example, emergency stop pushbuttons are preferably located in proximity to each work station in the manufacturing system to stop all area-specific motion if required during operation of the manufacturing system according to embodiments of the present disclosure. In addition, motion disabling pushbuttons are preferably located in to proximity to each work station in the manufacturing system to prevent the tooling from accidentally moving while persons may be in proximity of the work station housing the work item (and carrier) at a given time so as to avoid injury.

When a carrier is moved from a high bay loading station to the lift machine (such as lift machine 301 in FIG. 3), the carrier is elevated and then lowered from the lift machine. In an embodiment of the present disclosure, when the carrier is back on floor level, the turntable may be turned approximately 90 degrees to shift into low bay final assembly stations and maneuver along the manufacturing floor. These challenging movements are made possible by utilizing free swiveling carrier legs, air-powered rotators, railroad style switches, open-loop servo chain and rack and pinion drives.

The combination of steering and driving devices and methods to navigate the carrier between work stations makes this unique. The change in the direction of travel is achieved by utilizing two methods. First, each free-swiveling leg (i.e., a pair of wheels) of the carrier may be turned individually by turning the rotators. With this method, the carrier preferably will continue to travel 90 degrees to its previous direction. Second, the entire carrier may be turned 90 degrees by utilizing a turntable. This method enables the carrier to enter the low bay and travel through its work stations. Travel in a lengthwise direction is achieved by a series of rack and pinion drives. Each drive is engaging and disengaging the carrier on its own and "passing" it to the next drive. Travel in a sideways direction is achieved by chain drives engaging one leg of each carrier. The chain drives also are capable to "pass" the carrier to the next drive.

Other benefits of the disclosure include cost reduction, cost avoidance, freed-up space and safer operations both for personnel and the product. In the context of manufacturing/assembly of bonnets for aerospace applications, with respect to cost reduction, utilization of the manufacturing system according to embodiments of the present disclosure preferably reduces the 45 minutes to 1-hour crane time to 5-10 minutes per occurrence. The automatic riveting machine available time has been increased by 2-4 hours per bonnet. There is no interruption of other assembly operations during automatic riveting machine loading/unloading. The non-productive time is preferably reduced by 1½ to 2 hours per specific bonnets utilizing the lift machine as a work station. Further, the required skill set for a mechanic is preferably reduced, thereby increasing output while reducing hand tool requirements. The use of non crane-able carriers also saves in non-recurring tool fabrication costs. Alternative methods (i.e., use of self-propelled vehicles) would likely cost 2-3 times more and also increase floor space requirements and reduce flexibility and system performance.

The foregoing has outlined rather broadly the features and technical advantages of the present disclosure. Additional features and advantages of the disclosure will be described hereinafter which form the subject of the claims. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the description when considered in connection with the accompanying figures. It is to be expressly understood, however, that each of the figures is provided for the purpose of illustration and description only and is not intended as a definition of the limits of the present disclosure.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A manufacturing system for moving an assembly jig, said system comprising:
    a plurality of work stations positioned in a grid layout;
    at least one ground-mounted rail tracing said grid layout that receives an assembly jig and steers said assembly jig in variable directions within said grid layout, the assembly jig having free swiveling legs wherein each of the free swiveling legs is individually turnable;
    at least one rack and pinion drive to assist in longitudinal movement of said assembly jig within said grid layout;
    at least one chain drive to direct said assembly jig through transverse movements within said grid layout; and
    at least one rotator connected to the at least one ground-mounted rail, the at least one rotator individually turns each of the free swiveling legs of the assembly jig to change the direction of movement of the assembly jig traveling among said plurality of work stations on said at least one ground-mounted rail.

2. The manufacturing system of claim 1, said system further comprising:
    three chain drives for changing the direction of movement of said assembly jig on said at least one ground-mounted rail.

3. The manufacturing system of claim 1, said system further comprising:
    a turntable at a junction point of said plurality of work stations for changing the direction of movement of said assembly jig within said manufacturing system.

4. The manufacturing system of claim 1, wherein at least one of said plurality of work stations is a lift machine that lifts and lowers said assembly jig, transversely moves within said grid layout, and provides a functional work station wherein assembly and manufacturing tasks are performed.

5. The manufacturing system of claim 1, said system further comprising:
    a central control unit comprising a single processor for controlling movement of said assembly jig among said plurality of work stations.

6. The manufacturing system of claim 5 wherein said central control unit is elevated at a height above said plurality of work stations.

7. The manufacturing system of claim 1 wherein said at least one ground-mounted rail is a circular rail.

8. The manufacturing system of claim 1 wherein said at least one ground-mounted rail is a straight rail.

9. A manufacturing system comprising:
- a plurality of work stations positioned in a grid layout;
- a plurality of carriers for moving a work item among said plurality of work stations via both arbitrary and variable paths in a plurality of directions within the grid layout, the plurality of carriers each having free swiveling legs wherein each of the free swiveling legs is individually turnable;
- at least one rotator situated on said grid layout, the at least one rotator individually turns each of the free swiveling legs of the carrier to change the direction of movement of the carrier traveling among said plurality of work stations in said grid layout;
- wherein at least one of said plurality of work stations is a lift machine that lifts and lowers said plurality of carriers and said work item, transversely moves within said grid layout, and provides a functional work station wherein assembly and manufacturing tasks are performed; and
- a stationary platform connecting said plurality of work stations.

10. The manufacturing system of claim 9, said lift machine further comprising;
- three servo axes;
- one closed loop non servo axis; and
- one open loop platform axis.

11. The manufacturing system of claim 9 wherein at least one gear drive motor directs said at least one carrier and said work item onto said lift machine.

12. The manufacturing system of claim 9, said system further comprising:
- at least one sensor monitoring the position of said at least one carrier and said work item on said lift machine.

* * * * *